United States Patent
Park et al.

(10) Patent No.: US 8,741,482 B2
(45) Date of Patent: Jun. 3, 2014

(54) MIXED CATHODE ACTIVE MATERIAL HAVING IMPROVED POWER CHARACTERISTICS AND LITHIUM SECONDARY BATTERY INCLUDING THE SAME

(75) Inventors: Jung Hwan Park, Daejeon (KR); Song Taek Oh, Daejeon (KR); Geun Chang Chung, Daejeon (KR); Min Hee Lee, Daejeon (KR); Juichi Arai, Seoul (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/467,368

(22) Filed: May 9, 2012

(65) Prior Publication Data

US 2012/0244432 A1  Sep. 27, 2012

Related U.S. Application Data

(63) Continuation of application No. PCT/KR2012/001258, filed on Feb. 20, 2012.

(30) Foreign Application Priority Data

Feb. 21, 2011 (KR) .................. 10-2011-0014960

(51) Int. Cl.
*H01M 4/131* (2010.01)

(52) U.S. Cl.
USPC ........................................... 429/211

(58) Field of Classification Search
None
See application file for complete search history.

(56) References Cited

U.S. PATENT DOCUMENTS

| | | | |
|---|---|---|---|
| 2008/0026292 | A1 | 1/2008 | Paulsen et al. |
| 2008/0155812 | A1* | 7/2008 | Bowden et al. ............ 29/623.1 |
| 2008/0311432 | A1 | 12/2008 | Park et al. |
| 2009/0081529 | A1* | 3/2009 | Thackeray et al. ............ 429/52 |
| 2010/0279172 | A1 | 11/2010 | Hwang et al. |
| 2011/0311869 | A1 | 12/2011 | Oh et al. |

FOREIGN PATENT DOCUMENTS

| | | |
|---|---|---|
| JP | 6-29019 A | 2/1994 |
| JP | 2008-226693 A | 9/2008 |
| JP | 2009-009753 | 1/2009 |
| KR | 10-2007-0095261 A | 9/2007 |
| KR | 10-2008-0109298 A | 12/2008 |
| KR | 10-2010-0118825 A | 11/2010 |
| KR | 10-2011-0097719 A | 8/2011 |
| WO | WO 2006/028476 A2 | 3/2006 |
| WO | 2008/081839 A1 | 7/2008 |

OTHER PUBLICATIONS

Extended European Search Repot issued in European Patent Application No. 12749914.3 on Dec. 17, 1013.
International Search Report, dated Sep. 28, 2012, for International Application No. PCT/KR2012/001258 (From PCT/ISA/210).
Johnson, "Development and utility of manganese oxides as cathodes in lithium batteries", Journal of Power Sources, vol. 185 (2007) pp. 569-565.

* cited by examiner

*Primary Examiner* — Wyatt McConnell
(74) *Attorney, Agent, or Firm* — Birch, Stewart, Kolasch & Birch, LLP

(57) ABSTRACT

Provided are a mixed cathode active material including layered structure lithium manganese oxide expressed as Chemical Formula 1 and a second cathode active material having a plateau voltage profile in a range of 2.5 V to 3.3 V, and a lithium secondary battery including the mixed cathode active material. The mixed cathode active material and the lithium secondary battery including the same may have improved safety and simultaneously, may be used in an operating device requiring the foregoing battery by widening a state of charge (SOC) range able to maintain power more than a required value by allowing the second cathode active material to complement low power in a low SOC range.

12 Claims, 3 Drawing Sheets

MIXED CATHODE ACTIVE MATERIAL HAVING IMPROVED POWER CHARACTERISTICS AND LITHIUM SECONDARY BATTERY INCLUDING THE SAME

CROSS-REFERENCE TO RELATED APPLICATIONS

This application is a continuation of International Application No. PCT/KR2012/001258 filed on Feb. 20, 2012, which claims priority from Korean Patent Application No. 10-2011-0014960 filed in Republic of Korea on Feb. 21, 2011, the entire contents of which are incorporated herein by reference.

BACKGROUND OF THE INVENTION

The present invention disclosed herein relates to a secondary battery and a cathode and a cathode active material used therein.

Recently, lithium secondary batteries have been used in various fields including portable electronic devices such as mobile phones, personal digital assistants (PDAs), and laptop computers. In particular, in line with growing concerns about environmental issues, research into lithium secondary batteries having high energy density and discharge voltage as a power source of an electric vehicle able to replace vehicles using fossil fuels such as gasoline vehicle and diesel vehicle, one of major causes of air pollution, have been actively conducted and some of the research are in a commercialization stage. Meanwhile, in order to use a lithium secondary battery as a power source of the electric vehicle, the lithium secondary battery must maintain stable power in a usable state of charge (SOC) range along with high power.

An electric vehicle is classified as a typical electric vehicle (EV), battery electric vehicle (BEV), hybrid electric vehicle (HEV), or plug-in hybrid electric vehicle (PHEV) according to a power source thereof.

The HEV among the foregoing electric vehicles is a vehicle obtaining a driving force from the combination of typical internal combustion engine (engine) and electric battery, and has a mode, in which the driving force is mainly obtained through the engine while the battery assists insufficient power of the engine only in the case of requiring more power than that of a typical case, such as uphill driving, and SOC is recovered again through charging the battery during stop of the vehicle. That is, the engine is a primary power source in the HEV, and the battery is an auxiliary power source and is only used intermittently.

The PHEV is a vehicle obtaining a driving force from the combination of engine and battery rechargeable by being connected to an external power supply, and is broadly classified as parallel-type PHEV and series-type PHEV.

In the parallel-type PHEV, the engine and the battery are in an equivalent relationship to each other as a power source and the engine or the battery may alternatingly act as a primary power source according to the situation. That is, the parallel-type PHEV is operated in a mutually parallel mode, in which the battery makes up for insufficient power of the engine when the engine becomes a primary power source and the engine makes up for insufficient power of the battery when the battery becomes a primary power source.

However, the series-type PHEV is a vehicle basically driven only by a battery, in which an engine only acts to charge the battery. Therefore, since the series-type PHEV entirely depends on the battery rather than the engine in terms of driving of the vehicle, differing from the HEV or the parallel-type PHEV, maintaining of stable power according to battery characteristics in a usable SOC range becomes a very important factor for driving safety in comparison to other types of electric vehicles. The EV also requires a battery having a wide available SOC range.

Meanwhile, with respect to $LiCoO_2$, a typical cathode material of a high-capacity lithium secondary battery, practical limits of an increase in energy density and power characteristics have been reached. In particular, when $LiCoO_2$ is used in high energy density applications, oxygen in a structure of $LiCoO_2$ is discharged along with structural degeneration in a high-temperature charged state due to its structural instability to generate an exothermic reaction with an electrolyte in a battery and thus it becomes a main cause of battery explosion. In order to improve the safety limitation of $LiCoO_2$, uses of lithium-containing manganese oxides, such as layered crystal structure $LiMnO_2$ and spinel crystal structure $LiMn_2O_4$, and lithium-containing nickel oxide ($LiNiO_2$) have been considered, and a great deal of research into layered structure lithium manganese oxides expressed as the following Chemical Formula 1, in which Mn as an essential transition metal is added in an amount larger than those of other transition metals (excluding lithium) to layered structure lithium manganese oxide as a high-capacity material, has recently been conducted.

$$aLi_2MnO_3 \cdot (1-a)Li_xMO_2 \qquad \text{[Chemical Formula 1]}$$

(where $0<a<1$, $0.9 \leq x \leq 1.2$, and M is any one element or two or more elements selected from the group consisting of aluminum (Al), magnesium (Mg), manganese (Mn), nickel (Ni), cobalt (Co), chromium (Cr), vanadium (V), and iron (Fe).)

The lithium manganese oxide exhibits relatively large capacity and also exhibits relatively high power characteristics in a high SOC range. However, resistance may rapidly increase at an operating voltage limit, i.e., a low SOC range, and thus power may rapidly decrease and initial irreversible capacity may be large.

Various explanations related thereto have been described, but this may be generally described below. That is, the reason for this is that, as shown in the following reaction formulas, two lithium ions and two electrons are eliminated along with oxygen gas from $Li_2MnO_3$ constituting the layered structure lithium manganese oxide composite in a high voltage state of 4.5 V or more based on cathode potential during initial charge, but one lithium ion and one electron are only reversibly inserted into a cathode during discharge.

(Charge) $Li_2Mn^{4+}O_3 \rightarrow 2Li^+ + 2e^- + \frac{1}{2}O_2 + Mn^{4+}O_2$ (Discharge) $Mn^{4+}O_2 + Li^+ + e^- \rightarrow LiMn^{3+}O_2$ Thus, initial charge and discharge efficiency of $aLi_2MnO_3 \cdot (1-a)LiMO_2$ ($0<a<1$, M=Co, Ni, Mn, etc.) may differ according to a content of $Li_2MnO_3$ (a value), but may be lower than a typical layered structure cathode material, e.g., $LiCoO_2$, $LiMn_{0.5}Ni_{0.5}O_2$, or $LiMn_{0.33}Ni_{0.33}Co_{0.33}O_2$.

In this case, since capacity of an anode must be overdesigned in order to prevent lithium precipitation at the anode during an initial cycle according to the large irreversible capacity of $aLi_2MnO_3 \cdot (1-a)LiMO_2$, actual reversible capacity may decrease. Accordingly, efforts have been made to control such irreversible characteristics by using surface coating or the like, but limitations such as productivity may not be completely resolved to date. Also, with respect to the layered structure material, some limitations in safety have been reported.

Since there are disadvantages and limitations in using typical cathode active materials of a lithium secondary battery alone, use of a mixture formed thereof is required. In particular, in order to be used as a power source of medium and large sized devices, there is an urgent need for a lithium secondary battery having safety improved by exhibiting a uniform profile without a rapid voltage drop in an entire SOC range as well as having high capacity.

SUMMARY OF THE INVENTION

The present invention provides a high-capacity mixed cathode active material having a stable operating range, in which initial irreversible capacity is decreased by mixing a second cathode active material able to additionally absorb lithium to high-capacity layered structure lithium manganese oxide and a rapid decrease in power is improved by enabling an additional absorption of lithium in a low state of charge (SOC) range.

The present invention also provides a lithium secondary battery including the foregoing mixed cathode active material.

Embodiments of the present invention provide mixed cathode active materials including: lithium manganese oxide expressed as the following Chemical Formula 1; and a second cathode active material expressed as the following Chemical Formula 2 having a plateau voltage profile in a range of 2.5 V to 3.3 V,

$a\text{Li}_2\text{MnO}_3 \cdot (1-a)\text{Li}_x\text{MO}_2$      [Chemical Formula 1]

(where 0<a<1, 0.9≤x≤1.2, and M is any one element or two or more elements selected from the group consisting of aluminum (Al), magnesium (Mg), manganese (Mn), nickel (Ni), cobalt (Co), chromium (Cr), vanadium (V), and iron (Fe))

$x\text{MnO}_2 \cdot (1-x)\text{Li}_2\text{MnO}_3$ (where 0<x<1).      [Chemical Formula 2]

In some embodiments, the second cathode active material may be included in an amount range of 5 to 50 parts by weight based on 100 parts by weight of the mixed cathode active material.

In other embodiments, the mixed cathode active material may be used in a battery for a series-type plug-in hybrid electric vehicle (PHEV).

In still other embodiments, the mixed cathode active material may be used in a battery for an electric vehicle (EV).

In even other embodiments, the mixed cathode active material may further include a conductive material in addition to the lithium manganese oxide and the second cathode active material.

In yet other embodiments, the conductive material may be formed of graphite and conductive carbon.

In further embodiments, the conductive material may be included in an amount range of 0.5 to 15 parts by weight based on 100 parts by weight of the mixed cathode active material.

In still further embodiments, the conductive carbon may be a mixture of one or more selected from the group consisting of carbon black including carbon black, acetylene black, Ketjen black, channel black, furnace black, lamp black, or thermal black, or a material having a crystal structure of graphene or graphite.

In even further embodiments, the mixed cathode active material may further include one or more lithium-containing metal oxides selected from the group consisting of lithium cobalt oxide, lithium nickel oxide, lithium manganese oxide, lithium cobalt-nickel oxide, lithium cobalt-manganese oxide, lithium manganese-nickel oxide, lithium cobalt-nickel-manganese oxide, and oxides having other elements substituted or doped therein.

In yet further embodiments, the other elements may be one or more selected from the group consisting of aluminum (Al), magnesium (Mg), nickel (Ni), cobalt (Co), iron (Fe), chromium (Cr), vanadium (V), titanium (Ti), copper (Cu), boron (B), calcium (Ca), zinc (Zn), zirconium (Zr), niobium (Nb), molybdenum (Mo), strontium (Sr), antimony (Sb), tungsten (W), and bismuth (Bi).

In much further embodiments, the lithium-containing metal oxide may be included in an amount of 50 parts by weight or less based on 100 parts by weight of the mixed cathode active material.

In other embodiments of the present invention, cathodes include a current collector coated with the mixed cathode active material.

In still other embodiments of the present invention, lithium secondary batteries include the cathode.

In still much further embodiments, power of the lithium secondary battery in a state of charge (SOC) range of 20% to 40% may be 20% or more of power at 50% SOC.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF THE EMBODIMENTS

Figure 1:
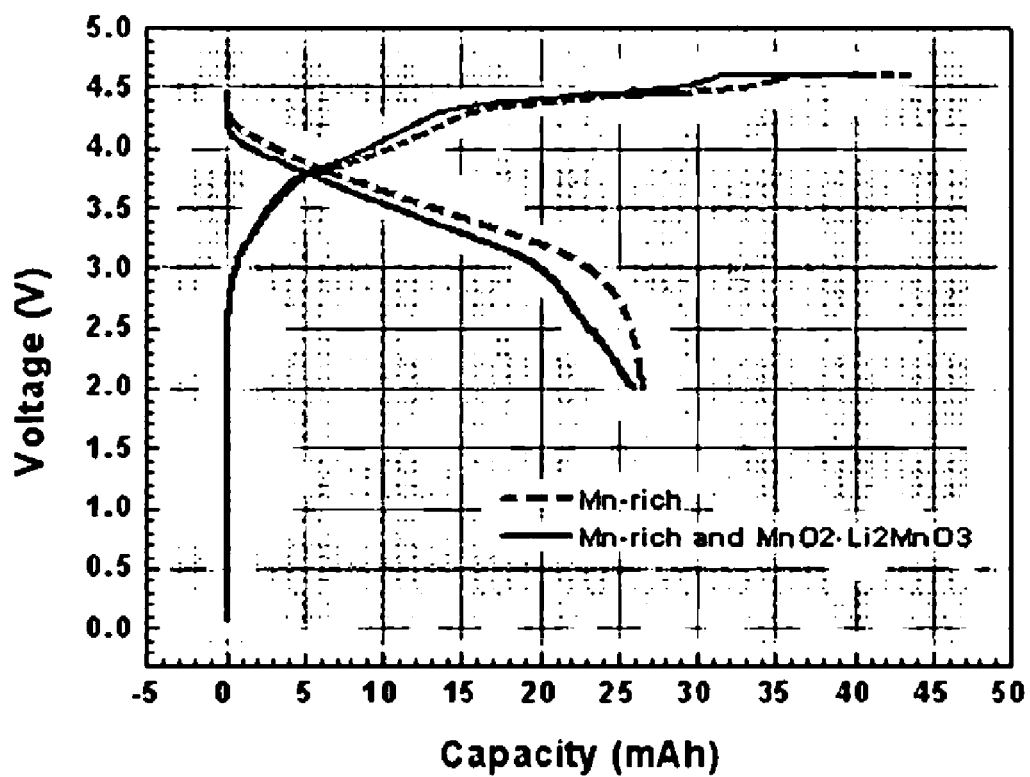
FIG. 1 is a graph showing each capacity of lithium secondary batteries according to Example and Comparative Example of the present invention.

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

Hereinafter, the present invention will be described in more detail.

The present invention provides a mixed cathode active material, in which layered structure lithium manganese oxide expressed as the following Chemical Formula 1 is mixed with a second cathode active material having a plateau voltage range lower than that of the lithium manganese oxide.

$a\text{Li}_2\text{MnO}_3 \cdot (1-a)\text{Li}_x\text{MO}_2$      [Chemical Formula 1]

(where 0<a<1, 0.9≤x≤1.2, and M is any one element or two or more elements selected from the group consisting of aluminum (Al), magnesium (Mg), manganese (Mn), nickel (Ni), cobalt (Co), chromium (Cr), vanadium (V), and iron (Fe).)

The layered structure lithium manganese oxide expressed as the above Chemical Formula 1 (hereinafter, referred to as "Mn-rich") includes Mn as an essential transition metal, has a content of Mn greater than those of other metals excluding lithium, and is a type of lithium transition metal oxides exhibiting large capacity during overcharging at high voltage.

Since Mn included as an essential transition metal in the layered structure lithium manganese oxide is included in an amount greater than those of other metals (excluding lithium), the content of Mn may be included in a range of 50 mol % to 80 mol % based on a total amount of metals excluding lithium. When the content of Mn is too low, safety may decrease, manufacturing costs may increase, and unique properties of the Mn-rich may not be obtained. On the other hand, when the content of Mn is too high, cycle stability may decrease. Since Mn in $Li_2MnO_3$ included in the Mn-rich is tetravalent as shown in the following chemical reaction formula, $Li_2MnO_3$ may not be further oxidized at an operating voltage of a typical lithium ion battery, and thus may have almost no electrochemical activity and may undergo a process in which oxygen eliminates with lithium as a form of $Li_2O$. However, since the eliminated oxygen may not reversibly enter into the inside of the layered structure lithium manganese oxide during discharge, only lithium may be inserted inside the material. Simultaneously, Mn in $Li_2MnO_3$ may be only reduced to $Mn^{3+}$ and thus this may be a cause to increase irreversible capacity of the material.

(Charge) $Li_2Mn^{4+}O_3 \rightarrow 2Li^+ + 2e^- + \tfrac{1}{2}O_2 + Mn^{4+}O_2$ (Discharge) $Mn^{4+}O_2 + Li^+ + e^- \rightarrow LiMn^{3+}O_2$ Therefore, high capacity may be obtained in the case that a content ratio of $Li_2MnO_3$ in the Mn-rich is increased so as to realize high capacity, but initial irreversible capacity of the material may increase.

Meanwhile, the Mn-rich has a predetermined range of plateau potential above oxidation/reduction voltage appearing by changes in oxidation numbers of components in a cathode active material. Specifically, a plateau potential range may be obtained at about 4.5 V to 4.8 V during overcharging at a high voltage of 4.5 V or more based on cathode voltage.

However, the Mn-rich has relatively high power in a high SOC range, but resistance may rapidly increase in a low SOC range (50% or less SOC) to greatly decrease power.

Therefore, the Mn-rich may be difficult to be used as a cathode material for a battery of operating devices requiring a wide available SOC range, such as PHEV or EV, by maintaining a state above a predetermined voltage in an as wide SOC range as possible.

Such phenomenon may also occur in the case that a cathode active material having a higher operating voltage than that of the Mn-rich is mixed, and the reason for this is that only the Mn-rich may still operate alone in a low SOC range.

A cathode active material according to the present invention is characterized in that the cathode active material includes a second cathode active material, which may improve a phenomenon of a rapid power decrease in a low SOC range because its operating voltage is lower than that of the Mn-rich and may reduce large initial irreversible capacity of the layered structure lithium manganese oxide because additional absorption of lithium (Li) is possible.

The second cathode active material is mixed for the purpose of assisting a power decrease in a low SOC range of the Mn-rich and is required to have plateau potential at a voltage lower than that at an operating voltage limit of the Mn-rich.

The second cathode active material may have a plateau voltage profile in a range of 2.0 V to 3.3 V and for example, may have a plateau voltage profile in a range of 2.5 V to 3.3 V.

As a result, the second cathode active material in addition to the Mn-rich is involved in insertion and elimination processes of Li in a low SOC range of the Mn-rich, a range of 2.0 V to 3.3 V, and thus a lithium secondary battery may be provided, in which an available SOC range becomes very wide by allowing the second cathode active material to complement low power of the Mn-rich within the foregoing voltage range.

When the second cathode active material is mixed with the Mn-rich, power in a high SOC range may be somewhat lower than that of the case of a cathode active material using the Mn-rich alone, due to a ratio of the Mn-rich decreased as much as a fraction of the included second cathode active material. However, with respect to a lithium secondary battery used in a series-type PHEV or EV, a lithium secondary battery able to maintain power of 2.5 V or more in an as wide SOC range as possible is required rather than a secondary battery exhibiting high capacity in a limited range of specific voltage. Therefore, a mixed cathode material according to the present invention and a lithium secondary battery including the same may give more desirable effects when used in the foregoing operating devices.

As described above, the second cathode active material is required to be lithium transition metal oxide having a plateau voltage profile in a range of 2.0 V to 3.3 V, for example, 2.5 V to 3.3 V, and may be required to be lithium transition metal oxide expressed as the following Chemical Formula 2.

$$xMnO_2 \cdot (1-x)Li_2MnO_3 \text{ (where } 0 < x < 1) \qquad \text{[Chemical Formula 2]}$$

A crystal structure of a cathode active material (composite-dimensional manganese oxide; hereinafter referred to as "CDMO") of Chemical Formula 2 is a composite structure including $Li_2MnO_3$ and $\gamma/\beta$-$MnO_2$. The crystal structure including only $\gamma/\beta$-$MnO_2$ may easily collapse, but the foregoing cathode active material may have a relatively solid structure by forming the composite structure with $Li_2MnO_3$.

The CDMO exhibits discharge characteristics higher than those of $\gamma/\beta$-$MnO_2$ in a cycle test at a depth of 0.14 e/Mn and cycle performance at a depth of 0.26 e/Mn exhibits discharge characteristics higher than those of spinel structure $LiMn_2O_4$.

Since charge and discharge may not be performed with the CDMO alone, only the CDMO may not be used as a cathode active material. However, when the CDMO is mixed with other cathode active materials, an operating voltage range of about 2.5 V to 3.3 V and an initial theoretical capacity of 200 mAh/g may be obtained during charge and discharge.

Since the CDMO exhibits the foregoing operating voltage, the CDMO may act to assist power at the operating voltage limit of the Mn-rich. Also, the CDMO act to reduce large initial irreversible capacity of the Mn-rich, and thus the irreversible capacity of the Mn-rich may be different from the composition or the presence of surface coating thereof. Therefore, an amount of Li included in the CDMO may be adjusted according to the irreversible capacity of the Mn-rich used in the present invention.

Since the mixed cathode active material according to the present invention exhibits relatively high capacity and a uniform profile over an entire SOC range by including the Mn-rich and the CDMO having operating voltage in a range of 2.5 V to 3.3 V and able to absorb additional lithium, a cathode active material having greatly improved power characteristics may be provided, and particularly, the mixed cathode active material according to the present invention may be used in an operating device such as a series-type PHEV or EV.

As described above, since the series-type PHEV is an electric vehicle operated with only a battery, differing from a HEV in which an engine is a primary power source and a parallel-type PHEV in which engine and battery operate in an equivalent relationship to each other as a power source, the battery may be only used in a SOC range, in which more than the power required for driving is maintained, due to the characteristics thereof, and the EV also requires a wide available SOC range.

Therefore, the mixed cathode active material according to the present invention and the lithium secondary battery including the same may give more desirable effects when used in an operating device, such as a parallel-type PHEV or EV, requiring a battery able to maintain predetermined voltage or more in an as wide SOC range as possible.

In the present invention, a method of forming a mixed cathode active material by mixing the Mn-rich and the second cathode active material is not significantly limited, and various methods known in the art may be used.

A composition ratio of the mixed cathode active material of the present invention is not particularly limited so long as it includes the Mn-rich and the CDMO. However, the ratio between the Mn-rich and the CDMO may be in a range of 50:50 to 95:5 and for example, may be in a range of 65:35 to 80:20.

When a content of the second cathode active material is greater than 50 parts by weight, high density and high energy lithium secondary battery may not be obtained. When the content of the second cathode active material is less than 5 parts by weight, objectives of power assistance in a low SOC range and accompanying safety improvement and reduction of irreversible capacity aimed in the present invention may not be achieved because the content of the second cathode active material is too low.

Also, in the mixed cathode active material according to the present invention, since particle sizes or shapes of the Mn-rich and the CDMO may be made to be as uniform as possible, a phenomenon may be prevented, in which a conductive material coating the mixed cathode material is concentrated on any one cathode active material having a larger specific surface area and as a result, conductivity of other cathode active material having the relatively less conductive material greatly decreases. Therefore, conductivity of the mixed cathode material may be greatly improved.

In order to reduce difference between the particle sizes or specific surface areas of two or more of the cathode active materials to be mixed, a method of forming a cathode active material having a relatively smaller particle size into large secondary particles, a method of forming a cathode active material having a relatively larger particle size into small particles, or a method of simultaneously using the foregoing two methods may be used.

The mixed cathode material may include two or more conductive materials having different particle sizes or shapes. A method of including the conductive material is not significantly limited and a typical method known in the art, such as coating of the cathode active material, may be used. As described above, this is for preventing a phenomenon in which the conductive material is concentrated on any one of the cathode active materials due to the particle size difference between the cathode active materials to be mixed. In a preferred embodiment of the present invention, graphite and conductive carbon may be simultaneously used as the conductive material.

The mixed cathode material may be simultaneously coated with graphite and conductive carbon having different particle sizes and shapes as the conductive material, and thus a decrease in conductivity or low power of the entire cathode active material due to the difference between particle sizes or surface areas of the Mn-rich and the CDMO may be more effectively improved. At the same time, a high-capacity cathode material for a series-type PHEV or EV having a wide available SOC range may be provided.

The mixed cathode active material may further include one or more lithium-containing metal oxides selected from the group consisting of lithium cobalt oxide, lithium nickel oxide, lithium manganese oxide, lithium cobalt-nickel oxide, lithium cobalt-manganese oxide, lithium manganese-nickel oxide, lithium cobalt-nickel-manganese oxide, and oxides having other elements substituted or doped therein. The other elements may be one or more selected from the group consisting of aluminum (Al), magnesium (Mg), nickel (Ni), cobalt (Co), iron (Fe), chromium (Cr), vanadium (V), titanium (Ti), copper (Cu), boron (B), calcium (Ca), zinc (Zn), zirconium (Zr), niobium (Nb), molybdenum (Mo), strontium (Sr), antimony (Sb), tungsten (W), and bismuth (Bi).

At this time, the lithium-containing metal oxide may be included in an amount of 50 parts by weight or less based on 100 parts by weight of the mixed cathode active material.

The graphite and conductive carbon are not particularly limited so long as they have excellent electrical conductivity and do not cause a side reaction in the inner environment of the lithium secondary battery or chemical changes in the present battery as well as having electrical conductivity.

Specifically, nature graphite or artificial graphite may be used without limitation as the graphite. A carbon-based material having high electrical conductivity may be particularly used as the conductive carbon, and specifically, a mixture of one or more materials selected from the group consisting of carbon black, such as carbon black, acetylene black, Ketjen black, channel black, furnace black, lamp black, or thermal black, or a material having a crystal structure of graphene or graphite may used as the conductive carbon. In some cases, a conductive polymer having high electrical conductivity may be used.

Herein, the conductive material formed of the graphite and the conductive carbon may be included in an amount range of 0.5 to 15 parts by weight based on 100 parts by weight of the mixed cathode material. When a content of the conductive material is too low, as less than 0.5 parts by weight, the foregoing effects may not be expected, and when the content of the conductive material is too high, as greater than 15 parts by weight, high capacity or high energy density may not be obtained due to a relatively less amount of the cathode active material.

At this time, a content of the conductive carbon may be included in an amount range of 1 to 13 parts by weight based on 100 parts by weight of the cathode material and for example, may be included in an amount range of 3 to 10 parts by weight.

The present invention provides a cathode material including the mixed cathode active material, a cathode of a lithium secondary battery having a current collector coated with the cathode material, and a lithium secondary battery including the foregoing cathode.

In general, a lithium secondary battery is composed of a cathode including a cathode material and a current collector, an anode including an anode material and a current collector, and a separator blocking electronic conduction between the cathode and the anode and able to conduct lithium ions, and an electrolyte for conduction of lithium ions is included in voids of electrode and separator materials.

The cathode and the anode are generally prepared by coating the current collectors with a mixture of electrode active material, conductive material, and binder, and then drying the coated collectors. A filler may be further added to the mixture as needed.

The lithium secondary battery of the present invention may be prepared according to a typical method known in the art.

Specifically, the lithium secondary battery may be prepared by inserting a porous separator between the cathode and the anode and introducing a non-aqueous electrolyte.

Power variation in a specific SOC range may be limited in a predetermined range in order to maintain stable power in a low SOC range and improve safety.

In a preferred embodiment of the present invention, power of the lithium secondary battery in a SOC range of 10% to 40% may be 20% or more of power at 50% SOC and for example, may be 50% or more of the power at 50% SOC.

The mixed cathode material, the cathode, and the lithium secondary battery according to the present invention, for example, may be used in a series-type PHEV or EV. The CDMO complements low power characteristics due to a rapid increase in resistance of the Mn-rich in a low SOC range such that more than the required power is maintained even in a low SOC range (10 to 40% SOC), and thus an available SOC range may become wide and at the same time, safety may improve.

Hereinafter, the present invention will be described in more detail according to specific examples.

Example

Preparation of Cathode

A slurry was prepared by adding 90 wt % of a mixture composed of $0.5Li_2MnO_3 \cdot 0.5LiMm_{1/3}Ni_{1/3}Co_{1/3}O_2$ (85 wt %) and $0.5MnO_2 \cdot 0.5Li_2MnO_3$ (15 wt %) as a cathode active material, 6 wt % of Denka black as a conductive material, and 4 wt % of polyvinylidene fluoride (PVDF) as a binder to N-methyl-pyrrolidone (NMP). An aluminum (Al) foil as a cathode current collector was coated with the slurry, and then the coated Al foil was rolled and dried to prepare a cathode for a lithium secondary battery.

Preparation of Lithium Secondary Battery

A porous polyethylene separator was disposed between the cathode thus prepared and a graphite-based anode, and a lithium electrolyte was introduced to prepare a polymer-type lithium secondary battery. The polymer-type lithium secondary battery was initially charged at 4.7 V, and then power was measured according to SOC during charge and discharge between 2.0 V and 4.5 V (C-rate=1 C).

Comparative Example

A polymer-type lithium secondary battery was prepared in the same manner as Example except that $0.5Li_2MnO_3 \cdot 0.5LiMn_{1/3}Ni_{1/3}Co_{1/3}O_2$ is only used as a cathode active material.

Experimental Example

Figure 2:
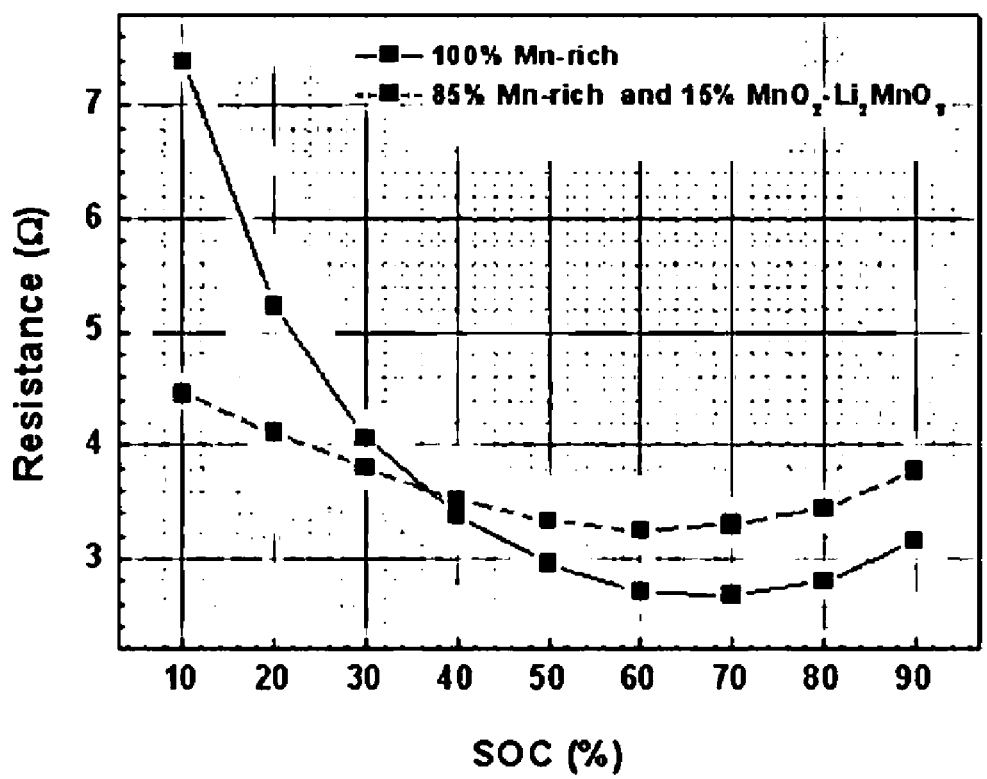
FIG. 2 is a graph showing resistances according to each state of charge (SOC) of lithium secondary batteries according to Example and Comparative Example of the present invention.
Figure 3:
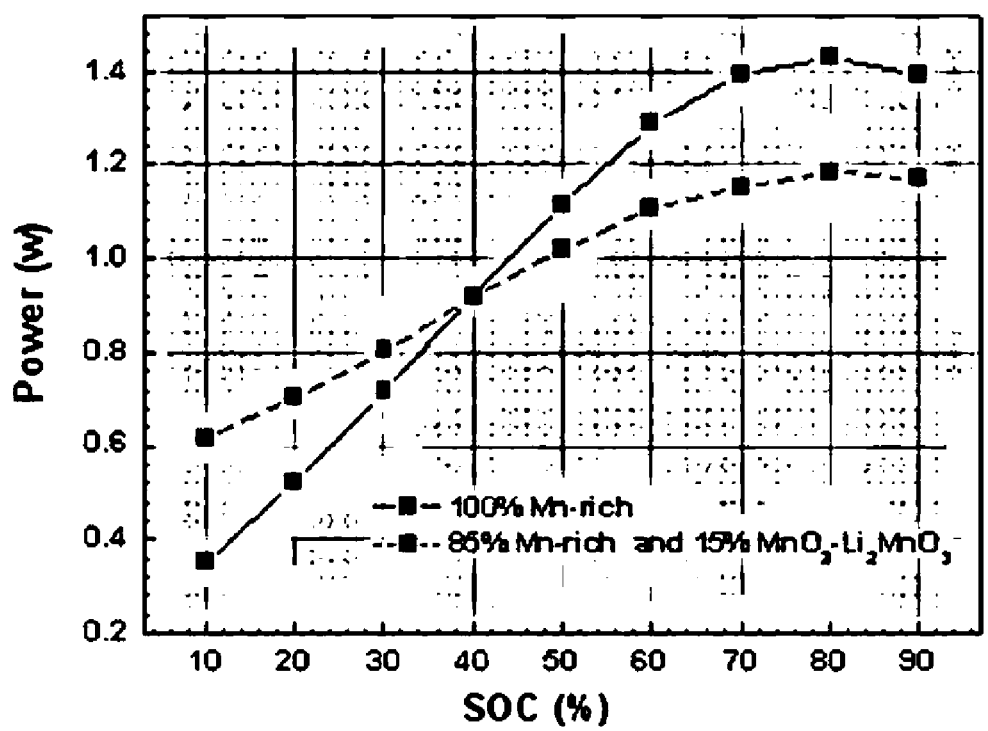
FIG. 3 is a graph showing powers according to each SOC of lithium secondary batteries according to Example and Comparative Example of the present invention.

With respect to full cell lithium secondary batteries prepared according to Example and Comparative Example, Capacities of the batteries in a voltage range of 2.0 V to 4.7 V and resistance and power variations according to SOC were measured and the results thereof are presented in FIGS. 1 to 3. Irreversible capacities are presented in the following Table 1.

TABLE 1

| (mAh/g) | Charge capacity | Discharge capacity | ICL | Efficiency |
|---|---|---|---|---|
| Mn-rich | 43.529 | 26.508 | 17.021 | 60.8% |
| Mn-rich and $MnO_2 \cdot Li_2MnO_3$ (85%:15%) | 39.309 | 25.717 | 13.592 | 65.4% |

As confirmed by efficiency data shown in Table 1, efficiency of the secondary battery according to the embodiment of the present invention was about 5% higher than that of Comparative Example, and thus it may be confirmed that irreversible capacity of the cathode active material according to the present invention was greatly reduced.

Also, as shown in FIGS. 1 to 3, power in a high SOC range of the secondary battery according to the present invention was somewhat lower than that of Comparative Example, but power in a low SOC range (a SOC range of about 10 to 50% in graphs) was almost not decreased and stably maintained. Therefore, it may be understood that an available SOC range was considerably wide.

On the other hand, with respect to Comparative Example, power in a high SOC range was somewhat higher than that of Example, but power in a low SOC range (a SOC range of about 10 to 50% in graphs) was rapidly decreased and thus it may be understood that an available SOC range became narrow. (Since the data shown in FIGS. 1 to 3 were only an example and detailed power values according to SOC may vary according to specifications of a cell, tendencies of the graphs may be important rather than the detailed values.)

With respect to the lithium secondary battery according to the present invention, a second cathode active material such as the CDMO was mixed with the Mn-rich having high capacity to complement low power of the Mn-rich in a low SOC range and thus more than the required power may be maintained in a wide SOC range. Therefore, it was confirmed that a lithium secondary battery having a wide available SOC range and improved safety may be provided.

The present invention may provide a secondary battery having a uniform profile without a rapid voltage drop in an entire SOC range as well as being inexpensive by mixing a second cathode active material able to additionally absorb lithium to relatively inexpensive, stable, and high-capacity layered structure lithium manganese oxide.

Since the secondary battery has a wide available SOC range, the second battery is used in operating devices requiring such batteries, particularly, PHEV or EV, to allow these devices to stably operate.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A mixed cathode active material comprising:
   a first cathode active material, comprising a lithium manganese oxide expressed as Chemical Formula 1 and
   a second cathode active material comprising a material expressed as Chemical Formula 2 having a plateau voltage profile in a range of about 2.5 V to about 3.3 V:

$aLi_2MnO_3 \cdot (1-a)Li_xMO_2$      [Chemical Formula 1]

where 0<a<1, 0.9≤x≤1.2, and M is any one element or two or more elements selected from the group consisting of Al (aluminum), Mg (magnesium), Mn (manganese), Ni (nickel), Co (cobalt), Cr (chromium), V (vanadium), and Fe (iron)

$yMnO_2 \cdot (1-y)Li_2MnO_3$      [Chemical Formula 2]

where 0≤y≤1,
   wherein the mixed cathode active material is suitable for use in a lithium secondary battery, wherein the lithium secondary battery is suitable for a series-type plug-in hybrid electric vehicle (PHEV) or electric vehicle (EV), and wherein a power of the lithium secondary battery in a state of charge (SOC) range of about 10% to about 40% is about 20% or more of power at about 50% SOC.

2. The mixed cathode active material of claim 1, wherein the second cathode active material is included in an amount range of about 5 to about 50 parts by weight based on 100 parts by weight of the mixed cathode active material.

3. The mixed cathode active material of claim 1, wherein the mixed cathode active material further comprises a conductive material.

4. The mixed cathode active material of claim 3, wherein the conductive material comprises graphite and conductive carbon.

5. The mixed cathode active material of claim 3, wherein the conductive material is included in an amount range of about 0.5 to about 15 parts by weight based on 100 parts by weight of the mixed cathode active material.

6. The mixed cathode active material of claim 4, wherein the conductive carbon is a mixture of one or more selected from the group consisting of carbon black including carbon black, acetylene black, Ketjen black, channel black, furnace black, lamp black, or thermal black, or a material having a crystal structure of graphene or graphite.

7. The mixed cathode active material of claim 1, wherein the mixed cathode active material further comprises at least a third cathode active material comprising one or more lithium-containing metal oxides selected from the group consisting of lithium cobalt oxide, lithium nickel oxide, lithium manganese oxide, lithium cobalt-nickel oxide, lithium cobalt-manganese oxide, lithium manganese-nickel oxide, lithium cobalt-nickel-manganese oxide, and oxides having other elements substituted or doped therein.

8. The mixed cathode active material of claim 7, wherein the other elements are one or more selected from the group consisting of Al (aluminum), Mg (magnesium), Ni (nickel), Co (cobalt), Fe (iron), Cr (chromium), V (vanadium), Ti (titanium), Cu (copper), B (boron), Ca (calcium), Zn (zinc), Zr (zirconium), Nb (niobium), Mo (molybdenum), Sr (strontium), Sb (antimony), W (tungsten), and Bi (bismuth).

9. The mixed cathode active material of claim 7, wherein the at least a third cathode active material is included in an amount of about 50 parts by weight or less based on 100 parts by weight of the mixed cathode active material.

10. A cathode comprising a current collector coated with the mixed cathode active material of claim 1.

11. A lithium secondary battery comprising the cathode of claim 10.

12. The mixed cathode active material of claim 1, wherein the first cathode active material is in amount of 85 wt %, and wherein the second cathode active material is present in an amount of 15 wt %.

* * * * *